United States Patent [19]

Toishi et al.

[11] Patent Number: 5,048,741
[45] Date of Patent: Sep. 17, 1991

[54] APPARATUS FOR PROTECTING LIGHT PROJECTOR FROM COLLISION WITH PUNCH OF BUTTON SETTING MACHINE

[75] Inventors: Yoshiyuki Toishi, Namerikawa; Toshiaki Sodeno, Toyama, both of Japan

[73] Assignee: Yoshida Kogyo K. K., Tokyo, Japan

[21] Appl. No.: 468,910

[22] Filed: Jan. 23, 1990

[30] Foreign Application Priority Data

Feb. 3, 1989 [JP] Japan .................................. 1-26299

[51] Int. Cl.⁵ ............................................ A41H 37/10
[52] U.S. Cl. ....................................... 227/18; 227/43; 227/119; 227/156
[58] Field of Search ..................... 227/18, 31, 119, 37, 227/38, 156, 43

[56] References Cited

U.S. PATENT DOCUMENTS

| | | | |
|---|---|---|---|
| 3,964,661 | 6/1976 | Schmidt et al. | 227/18 |
| 4,605,150 | 8/1986 | Ikehara | 227/18 |
| 4,723,357 | 2/1988 | Suyama et al. | 29/721 |
| 4,765,524 | 8/1988 | Yoshieda | 227/18 |

FOREIGN PATENT DOCUMENTS 0255913 2/1988 European Pat. Off. .
0261361 3/1988 European Pat. Off. .
2191139 12/1987 United Kingdom .

Primary Examiner—Frank T. Yost
Assistant Examiner—John M. Husar
Attorney, Agent, or Firm—Hill, Van Santen, Steadman & Simpson

[57] ABSTRACT

An apparatus for protecting a horizontally reciprocable light projector from collision with a vertically reciprocable punch of a button setting machine, wherein a lost motion mechanism is provided for producing a delay between retracting movement of the light projector and the downward movement of the punch to such an extent that the light projector is retracted from the vertical path of movement of the punch before the punch starts moving downward. The lost motion mechanism is composed of a shaft having an annular actuating flange, and a cylinder member slidably receiving therein the shaft. The actuating flange is normally separated from the cylinder member and engageable with the cylinder member to lower the punch when the light projector is retracted from the vertical path of movement of the punch.

11 Claims, 6 Drawing Sheets

APPARATUS FOR PROTECTING LIGHT PROJECTOR FROM COLLISION WITH PUNCH OF BUTTON SETTING MACHINE

BACKGROUND OF THE INVENTION

1. Field of the Invention

The present invention relates generally to a button setting machine having an optical position indicator for indicating a correct location in alignment between a punch and a die of the button setting machine, and more particularly to a method and apparatus for protecting the optical position indicator from collision with the punch.

2. Description of the Prior Art

Optical position indicators composed of light projectors are incorporated in button setting machines for indicating an accurate position on the garment fabric where upper and lower elements of a fastener, such as a stud button for denim jeans, are to be attached by and between a punch and a die of the button setting machine. For an accurate positioning, it is desirable that the light projector is disposed in a position directly below the punch. To this end, the light projector is mounted on a reciprocable pusher which is constructed to commence retracting movement of the light projector in synchronism with the downward movement of the punch. In order to prevent accidental interference or collision between the punch and the light projector, the retraction of the light projector from the path of movement of the punch must be completed before the punch is lowered to the level of the light projector. This means that a relatively large space must be provided between a lower end of the punch and the light projector. With this large spacing, the punch has a long stroke and hence the button setting machine becomes large as a whole. Another drawback resulting from the large spacing between the punch and the light projector is that a perfect synchronization between the downward movement of the punch and the retracting movement of the light projector is difficult to maintain and the button setting machine is complicated in construction.

One prior attempt proposed to overcome the foregoing difficulties includes a light projector such as disclosed in Japanese Utility Model Laid-open Publication No. 63-183227. The disclosed light projector is pivotably connected to a holder member secured to a horizontally reciprocable pusher and is urged upwardly by a resilient member. With this construction, when the punch while being driven downwardly interferes with or collides with the light projector, the light projector pivots downwardly away from the path of movement of the punch against the bias of the resilient member.

The downwardly pivotable light projector is simple in construction however it is likely to be damaged by impact forces applied thereto each time the punch collides with the light projector. Furthermore, a repeated collision with the punch gradually deteriorates the positioning accuracy of the light projector.

SUMMARY OF THE INVENTION

With the foregoing difficulties in view, it is an object of the present invention to provide a method and apparatus for protecting a light projector from collision with a punch of a button setting machine without increasing the stroke of the punch and hence the overall size of the button setting machine.

According to a first aspect of the present invention, there is provided a method of protecting a horizontally reciprocable light projector from collision with a vertically reciprocable punch of a button setting machine having a power driven rotating drive member, the light projector being normally disposed directly below the punch, the method comprising the steps of: transmitting a drive force from the rotating drive member to the light projector for retracting the light projector from a vertical path of movement of the punch; transmitting a drive force from the rotating drive member to the punch for causing the punch to first move downward and subsequently move upward; mechanically providing a delay between the retracting movement of the light projector and the downward movement of the punch to such an extent that the light projector is retracted from the vertical path of movement of the punch before the punch starts moving downward; and after the punch is caused to move to its uppermost position, advancing the light projector in its initial position located directly below the punch.

According to a second aspect of the present invention, there is provided an apparatus for protecting a horizontally reciprocable light projector from collision with a vertically reciprocable punch of a button setting machine, the button setting machine including a power-driven rotating drive member, the light projector being normally disposed directly below the punch, the apparatus comprising: first means for transmitting a driving power from the rotating drive member to the light projector to reciprocate the light projector along a horizontal path; second means for transmitting a driving power from the rotating drive member to the punch to reciprocate the punch along a vertical path; and mechanical means for producing a delay between retracting movement of the light projector and the downward movement of the punch to such an extent that the light projector is retracted from the vertical path of movement of the punch before the punch starts moving downward.

According to a preferred embodiment, the first power transmitting means includes a cam rotated by the rotating drive member and a pivotable cam lever operatively connected with the light projector and driven by the cam to reciprocate the light projector toward and away from the vertical path of movement of the punch. The second power transmitting means includes a crank mechanism operatively connected with the punch and the cam and driven by the cam to reciprocate the punch along the vertical path. The delay-producing mechanical means including a lost motion mechanism incorporated in the crank mechanism.

The lost motion mechanism may include a shaft having an annular actuating flange, and a cylinder member slidably receiving therein the shaft. The actuating flange is normally separated from the cylinder member and engageable with the cylinder member to lower the punch when the light projector is retracted from the vertical path of movement of the punch. As an alternative, the lost motion mechanism is composed of an oblong hole and a pin slidably received in the oblong hole. The oblong hole has one end edge normally separated from the pin and engageable with the pin to lower the punch when the light projector is retracted from the vertical path of movement of the punch.

According to another preferred embodiment, the delay producing mechanical means comprises first and second cam surfaces of a composite cam rotated by the rotating drive member. The first and second cam surfaces have respective cam profiles which is capable of producing the delay between the retracting movement of the light projector and the downward movement of the punch.

The above and other objects, features and advantages of the present invention will become manifest to those versed in the art upon making reference to the detailed description and the accompanying sheets of drawings in which preferred structural embodiments incorporating the principles of the present invention are shown by way of illustrative example.

DETAILED DESCRIPTION

Figure 1:
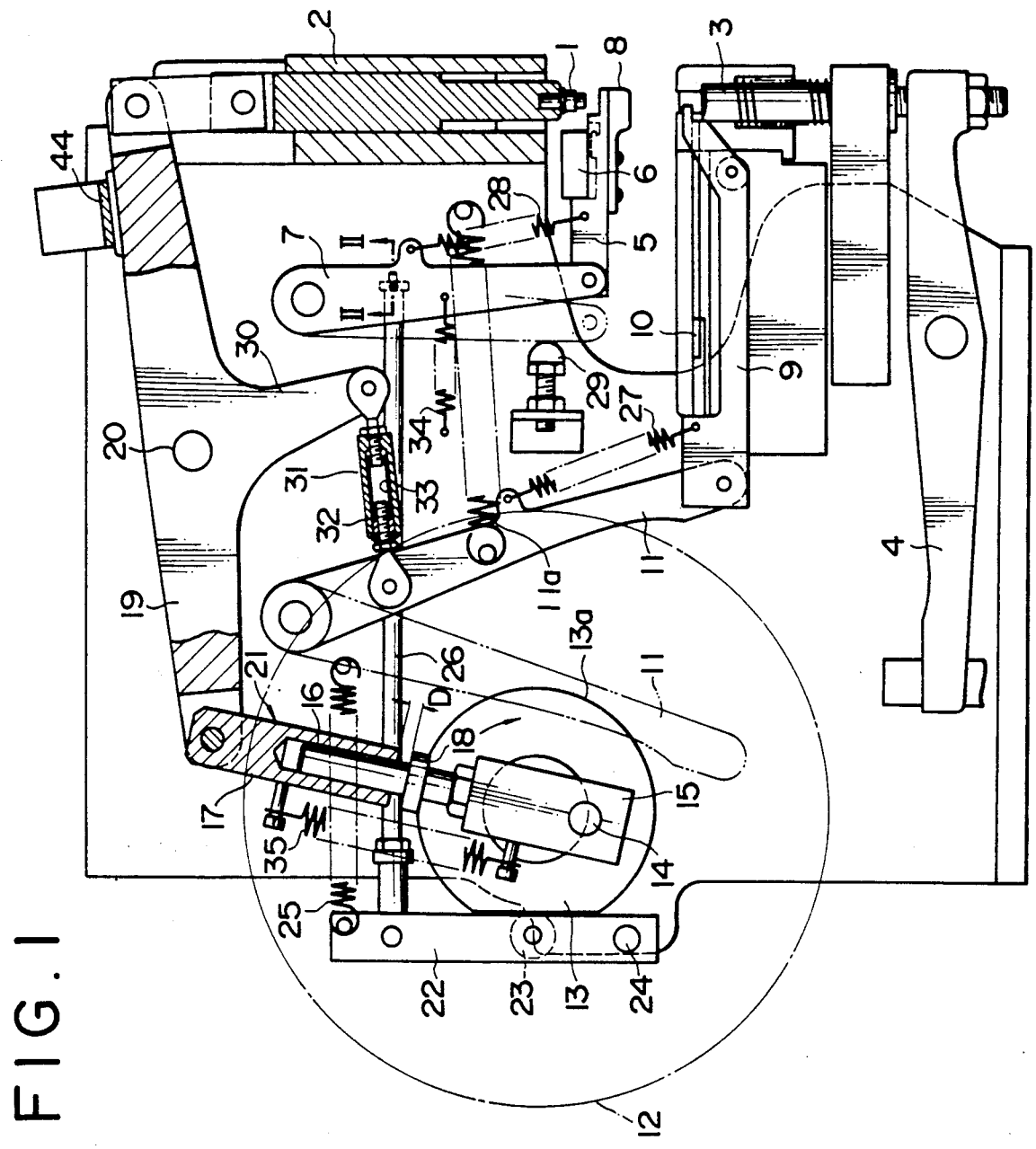
FIG. 1 is a front elevational view, partly in cross section, of a button setting machine incorporating an apparatus for protecting an optical position indicator from collision with a punch of the button setting machine according to the present invention.

Referring to the drawings, wherein like reference characters designate like or corresponding parts throughout the several views, and more particularly to FIG. 1, there is shown a button setting machine for assembling upper and lower elements (not shown) of a garment fastener, such as a button, a stud button or a snap fastener, in clinched condition with a garment fabric sandwiched therebetween. The button setting machine includes an apparatus for protecting an optical indicator composed of a light projector from collision with a punch of the button setting machine according to the present invention.

The button setting machine includes a punch 1 for forcing the upper fastener element into clinching engagement with the lower fastener element. The punch 1 is reciprocable vertically with respect to a frame 2 of the button setting machine. A die 3 is supported by the frame 2 directly below the punch 1 for holing thereon the lower fastener element. The punch 1 and the die 3 cooperate with each other to clinch the upper and lower fastener elements with a garment fabric disposed therebetween. The die 3 is connected at its lower end to one end of a lever 4 which is connected at its opposite end to a shock absorber (not shown) for taking up or absorbing a shock force applied to the die 3 when the upper and lower fastener elements are clinched together.

The button setting machine further includes an upper pusher 5 for receiving an upper fastener element at a time from an upper chute 6 and for supplying the upper fastener element to an upper pocket or holder (not shown) disposed immediately below the punch 1 for holding the upper fastener element. The upper pusher 5 is pivoted to an upper pusher lever 7 so that it is movable alternately back and forth along a horizontal path in response to the pivotal movement of the upper pusher lever 7. The upper pusher 5 carries on its under side an optical position indicator 8 for indicating a position of the garment fabric where the upper and lower fastener elements are to be attached. The optical position indicator 8 comprises a light projector.

A lower pusher 9 is movably supported on the frame 2 for receiving a lower fastener element at a time from a lower chute 10 and for supplying the lower fastener element to the die 3. The lower pusher 9 is pivoted to a lower pusher lever 11 and horizontally reciprocable in response to the pivotal movement of the lower pusher lever 11. The lower pusher lever 11 is urged by a tension coil spring 11a to turn counterclockwise in FIG. 1 for normally holding the lower pusher 9 in its fully advanced position. When the lower pusher 9 is fully retracted, the forward end of the lower pusher 9 is disposed behind (left side in FIG. 1) the lower end of the lower chute 10.

The punch 1, the upper pusher 5 including the light projector 8, and the lower pusher 9 are all driven by a common drive unit including a fly wheel 12 continuously rotated by an electric motor via a V-belt (neither shown). A radial disk cam 13 is concentrically mounted on a central shaft of the fly wheel 12 via a single-revolution clutch (not shown). The single-revolution clutch is engaged to connect the continuously rotating fly wheel 12 and the cam 13 when a foot pedal (not shown) is depressed. When the cam 13 completes one revolution, the single-revolution clutch is disengaged to separate the cam 13 from the continuously rotating fly wheel 12.

The cam 13 has an eccentric pin 14 projecting from an end face thereof and pivoted to a lower end of a crank lever 15. The crank lever 15 is directly connected at its upper end with a shaft 16 slidably received in a cylinder member 17. The shaft 16 has an actuator in the form of an annular flange 18 engageable with the lower end of the cylinder member 17. The actuating flange 18 is spaced a distance D from the lower end of the cylinder member 17 when the punch 1 is in its uppermost position. The upper end of the cylinder member 17 is pivoted to one end of a T-shaped lever 19, the opposite end of the T-shaped lever 19 being operatively connected to an upper end of the punch 1. The T-shaped lever 19 is pivotally movable about a shaft 20 to reciprocate the punch 1 vertically toward and away from the die 3. With this construction, when the cam 13 is driven to rotate, the shaft 16 immediately starts moving upwardly into the cylinder member 17. In this instance, however, due to the space D provided between the annular actuating flange 18 and the lower end of the cylinder member 17, pivotal movement of the T-shaped lever 19 does not occur until the annular actuating flange 18 on the shaft 16 abuts against the lower end of the cylinder member 17. Thus, the shaft 16 and the cylinder member 17 jointly constitute a lost motion mechanism 21 which produces the lost motion or the delay between the movement of a driver (cam 13 in the illustrated embodiment) and the movement of a follower (the T-shaped lever 19 in the illustrated embodiment).

Figure 2:
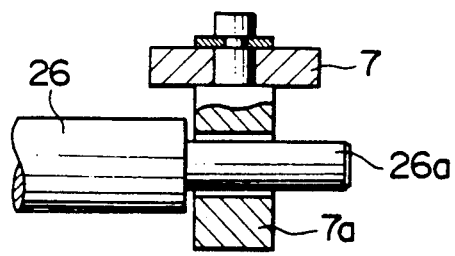
FIG. 2 is an enlarged cross-sectional view taken along line II—II of FIG. 1.

A vertical cam lever 22 is pivotally connected at its lower end to a horizontal shaft 24 secured to the frame 2 and has a roller follower 23 rollingly engageable with a cam surface 13a of the cam 13. When cam 13 rotates, the cam lever 22 angularly oscillates about the shaft 24. The cam lever 22 is normally urged by a tension coil spring 25 in a direction to keep the roller follower 23 into contact with the cam surface of the cam 13. The cam lever 22 is pivoted at its upper end portion to one end of a horizontal actuating rod 26, the opposite end of the actuating rod 26 being connected with the upper pusher lever 7. The connection between the actuating rod 26 and the upper pusher lever 7 is such that a small-diameter end portion 26a of the actuating rod 26 is slidably received in a hole in a bearing 7a provided on the upper pusher lever 7, as shown in FIG. 2.

The T-shaped lever 19 has a vertical arm 30 extending downwardly from a substantially central portion of the lever 19 and pivotally connected at its distal end to one end of an expansion pipe joint 31. The opposite end of the expansion pipe joint 31 is pivoted to the lower pusher lever 11 adjacent to an upper end thereof. The expansion pipe joint 31 is composed of an outer pipe 32 connected to the arm 30 and an inner pipe 33 connected to the lower pusher lever 11 and slidably received in the outer pipe 32. With the expansion pipe joint 31 thus provided, only the pivotal movement of the T-shaped lever 19 in the clockwise direction is transmitted to the lower pusher lever 11 while the pivotal movement of the T-shaped lever 19 in the counterclockwise direction has no effect on the movement of the lower pusher lever 11. When the T-shaped lever 19 turns counterclockwise about the shaft 20, the lower pusher lever 11 follows the angular movement of the T-shaped lever 19. However, this angular movement of the lower pusher lever 11 is caused by the force of the tension coil spring 11a and does not result from pivotal movement of the T-shaped lever 19. Consequently, when a lower fastener element jams as it is fed by the lower pusher 9 toward the die 3, advancing movement of the lower pusher 9 is interrupted by the jamming lower fastener element. If the T-shaped lever 19 and the lower pusher lever 11 are directly connected together, the lower pusher lever 11 is forced by the T-shaped lever 19 to turn counterclockwise, thereby forcibly advancing the lower pusher 9 even when jamming of the lower fastener element takes place. Such forcible feeding of the jamming fastener element would damage the button setting machine.

A tension coil spring 27 acts between the lower pusher lever 11 and the lower pusher 9 to urge the latter slightly upwardly so as not to sink the forward end of the lower pusher 9. Likewise, a tension coil spring 28 acts between the upper pusher lever 7 and the upper pusher 5 to urge the latter slightly upwardly for holding the horizontal posture of the upper pusher 5. A stopper 29 is disposed behind the upper pusher lever 7 and engageable with the same to limit backward or retracting movement of the upper pusher 5. The stopper 29 comprises a stop bolt and hence is adjustable in position so that the backward stroke of the upper pusher 5 can be adjusted. The upper pusher lever 7 is urged by a tension coil spring 34 to turn clockwise toward the stopper 29. The upper pusher lever 7 is turned counterclockwise against the force of the tension coil spring 34 when the actuating rod 26 is advanced toward the upper pusher lever 7. Due to the loose fitting connection between the small-diameter end portion 26a of the actuating rod 26 and the bearing 7a on the upper pusher lever 7, retracting movement of the actuating rod 26 permits the upper pusher lever 7 to turn clockwise under the force of the tension coil spring 34, thereby retracting the upper pusher 5 and the light projector 8.

The button setting machine of the foregoing construction operates as follows. For purposes of illustration, operation of the button setting machine begins from a condition shown in FIG. 1 where the punch 1 is fully retracted, while the upper and lower pushers 5, 9 are fully advanced so that an upper fastener element is held by the upper holder below the punch 1 and a lower fastener element is placed on the die 3. The light projector 8 mounted on the upper pusher 5 assumes its advanced position. When a start switch (not shown) of the button setting machine is turned on, the motor-driven fly wheel 12 rotates continuously. In this instance, the single-revolution clutch is in the disengaged state so that the rotational movement of the fly wheel 12 is not transmitted to the cam 13. The light projector 8 projects a light beam passing along a common vertical axis of the punch 1 and the die 3. The light beam produces a light spot on a garment fabric when the latter is disposed between the light projector 8 and the die 3.

After a position on the garment fabric where the upper and lower fastener elements are to be attached has been set in registry with the light spot, a foot pedal is depressed whereupon the single-revolution clutch is engaged to connect the continuously rotating fly wheel 12 and the cam 13, thereby rotating the cam 13 in the clockwise direction as indicated by the arrow shown in FIG. 1. The clockwise movement of the cam 13 causes the roller follower 23 to relatively move from a flat cam surface to an arcuate cam surface 13a so that the cam lever 22 is turned counterclockwise about the shaft 24 against the force of the tension coil spring 25. With this counterclockwise movement of the cam lever 22, the actuating rod 26 is retracted whereupon the upper pusher lever 7 is permitted to turn clockwise under the force of the tension coil spring 34 until it assumes its fully retracted position indicated by the phantom lines. As a result, the upper pusher 5 and the light projector 8 mounted thereon are retracted away from a vertical path of movement of the punch 1. The retracting movement of the upper pusher 5 and the light projector 8 is completed before the cam 13 advances through an angular distance which is equivalent to a linear advancing movement of the shaft 16 over the distance D (i.e., the lost motion) provided by the lost motion mechanism 21. With the action of the lost motion mechanism 21, the T-shaped lever 19 is kept immovable so that downward movement of the punch 1 never occurs before the upper pusher 5 and the light projector 8 are fully retracted.

A continuing clockwise movement of the cam 13 causes the eccentric pin 14 to further advance the shaft 16 into the cylinder member 17 whereupon the annular actuating flange 18 on the shaft 16 is brought into abutment with the lower end of the cylinder member 17. Thereafter, the shaft 16 and the cylinder member 17 move upwardly in unison with each other against the force of a tension coil spring 35 so that the T-shaped lever 19 is turned about the shaft 20 in the clockwise direction to thereby lower the punch 1 toward the die 3. When the cam 13 has advanced through an angle of 180 degrees, the eccentric pin 14 is disposed in its uppermost position and the punch 1 is fully advanced. The upper and lower fastener elements are thus attached to the garment fabric accurately at the desired position. As the cam 13 further continues its clockwise movement, the eccentric pin 14 moves from its uppermost position toward its lowermost position. Consequently, the cylinder member 17 is lowered by the force of the tension coil spring 35 whereby the T-shaped lever 19 is turned counterclockwise to thereby retract the punch 1 upwardly away from the die 3. The downward movement of the cylinder member 17 is limited to such an extent that the distance D is provided between the annular actuating flange 18 and the lower end of the cylinder member 17 when the eccentric pin 14 is disposed in its lowermost position. In the illustrated embodiment, the downward movement of the cylinder member 17 is limited by a stopper 44 which is provided on the frame 2 and engageable with the T-shaped lever 19 to limit its pivotal movement in the counterclockwise direction. When the cam 13 completes a single revolution, the single revolution clutch is disengaged to thereby separate the cam 13 from the continuously rotating fly wheel 12. In this instance, the cam 13 is disposed in its initial position and hence the cam lever 22 is turned about the shaft 24 clockwise by the force of the tension coil spring 25. The clockwise movement of the cam lever 22 advances the actuating rod 26 to turn the upper pusher lever 7 counterclockwise, thereby advancing the upper pusher 5 and the light projector 8 into a position directly below the punch 1.

As described above, the punch 1 descends only after the upper pusher 5 and the light projector 8 are fully retracted away from the vertical path of movement of the punch 1. Accordingly, collision or accidental interference between the light projector 8 and the punch 1 can be completely avoided even when the light projector 8 is disposed near the lower end of the punch 1. With this timed relation between the movement of the punch 1 and the movement of the light projector 8, the provision of the light projector 8 does not increase the stroke of the punch 1 and hence the overall size of the button setting machine is relatively small.

The distance D between the annular actuating flange 18 on the shaft 16 and the lower end of the cylinder member 17 may be selected in such a manner that the distance D becomes zero (D=0) and hence the downward movement of the punch 1 begins at a moment when the light projector 8 is rearwardly offset from the vertical path of movement of the punch 1.

Figure 3:
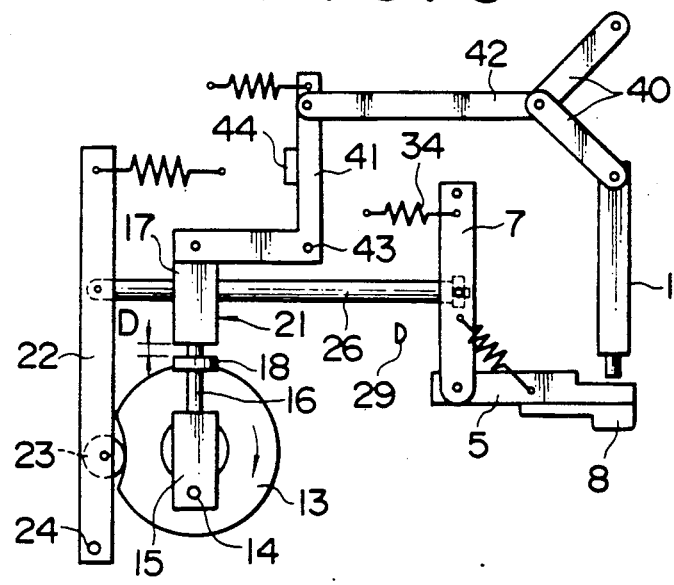
FIG. 3 is a diagrammatical front elevational view showing the general construction of a collision protection apparatus according to another embodiment.

FIG. 3 diagrammatically shows a portion of the button setting machine having a collision protection apparatus according to another embodiment of the present invention. The collision protection apparatus is similar to the apparatus shown in FIG. 1 but differs therefrom in that the punch 1 is pivoted at its upper end to one lever of a toggle joint 40, and that the cylinder member 17 of a lost motion mechanism 21 is pivotally connected at its upper end to one end of a L-shaped lever or bell-crank 41, the opposite end of the bell-crank 41 being connected with the toggle joint 40 via a link 42. As the cam 13 is rotated clockwise as indicated by the arrow, the cam lever 22 is pivoted leftward to thereby retract the light projector 8 attached to the upper pusher 5, then the cylinder member 17 moves upwardly to turn the bell-crank 41 clockwise about a shaft 43 whereupon the toggle joint 40 is expanded by the link 42 to thereby lower the punch 1. Likewise the embodiment shown in FIG. 1, the retracting movement of the light projector 8 begins while the punch 1 is at rest in the uppermost position, and the downward movement of the punch 1 is started after the light projector 8 is retracted from the vertical path of movement of the punch 1. Accordingly, the light projector 8 is protected from collision with the punch 1. Designated by 44 is a stopper engageable with the bell-crank 41 to provide a distance D between the annular actuating flange 18 and the cylinder member 17, that is, the delay between the retracting movement of the light projector 8 and the downward movement of the punch 1. The distance D becomes zero (D=0) and hence the downward stroke of the punch 1 begins when the light projector 8 is retracted from the vertical path of movement of the punch 1.

Figure 4:
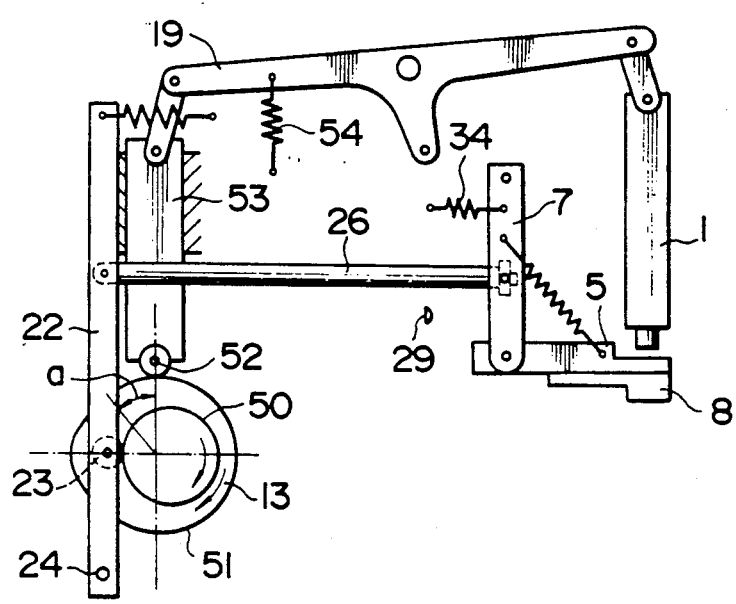
FIG. 4 is a view similar to FIG. 3, but showing the construction of a modified collision protection apparatus.

A modified collision protection apparatus shown in FIG. 4 is substantially the same as the apparatus shown in FIG. 1 with the exception that the cam 13 is a composite cam having a first cam surface 50 profiled to retract the light projector 8, and a second cam surface 51 profiled to vertically reciprocate the punch 1, the first cam surface 50 being eccentric to the axis of rotation of the cam 13 and the second cam surface 51. When the cam 13 is rotated in the direction of the arrow, the first cam surface 50 urges the roller follower 23 outwardly (leftward in FIG. 4). The cam lever 22 is therefore turned counterclockwise about the shaft 24 to thereby retract the actuating rod 26. In response to the retracting movement of the actuating rod 26, the upper pusher lever 7 is turned in the clockwise direction by the force of the tension coil spring 34 so that the light projector 8 is retracted from the vertical path of movement of the punch 1. The second cam surface 51 has an approximately pear-shaped profile having a circular curve of a constant radius of curvature which is concentric with the axis of rotation of the cam 13 and extends over a substantial part of the full circumference of the cam profile. A portion of the second cam surface having the constant radium of curvature continuously engages a roller follower 52 until the cam 13 moves through a predetermined angular distance a. During that time, a camming action tending to lift a vertically slidable connecting rod 53 is not imparted from the second cam surface 51 to the roller follower 52. As a result, the T-shaped lever 19 is kept immovable and hence the punch 1 is held in its uppermost position. The downward movement of the punch 1 begins when the angular movement of the cam 13 exceeds the predetermined angular distance a. Thus, the first and second cam surfaces 50, 51 are arranged in such a relation that the predetermined angular distance a introduces a pause of a desired length into the motion of the connecting rod 53 and hence the motion of the punch 1. The length of the pause in motion corresponds to the delay between the retracting movement of the light projector 8 and the downward movement of the punch 1 which is produced by the distance D provided by the lost motion mechanism 21 described with respect to the foregoing embodiments shown in FIGS. 1 and 3. Thus, the second cam surface 51 and the connecting rod 53 having the roller follower 52 jointly constitutes a modified delay producing mechanism. The upward movement of the punch 1 is achieved by the force of a tension coil spring 54 acting on the T-shaped lever 19.

Figure 5:
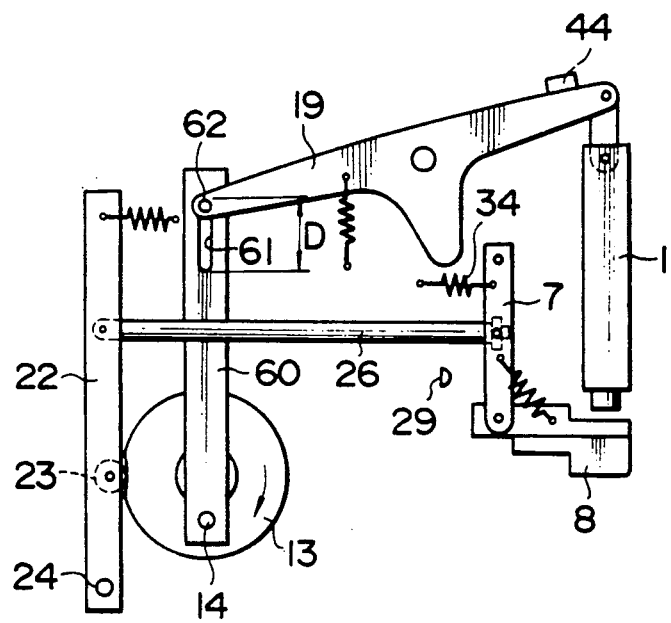
FIG. 5 is a diagrammatical front elevational view showing a collision protection apparatus according to another embodiment.

FIG. 5 shows a portion of the button setting machine incorporating a collision protection apparatus according to a fourth embodiment of the present invention. The collision protection apparatus is similar to the apparatus shown in FIG. 1 but differs therefrom in the construction of a lost motion mechanism. In this embodiment, the lost motion mechanism includes an elongate vertical lever 60 having an oblong hole 61 extending longitudinally along an upper end portion of the vertical lever 60, and a pin 62 movably received in the oblong hole 60 and connected to one end of the T-shaped lever 19. The oblong hole 61 has a length D which is equal to the distance D provided by the lost motion mechanism 21 shown in FIG. 1. With this construction, the cam 13 is rotated in the direction of the arrow whereupon the cam lever 22 is caused to turn about the shaft 24 in the counterclockwise direction. This pivotal movement of the cam lever 22 causes the light projector 8 to retract from the vertical path of movement of the punch 1 under the force of the tension coil spring 34. During that time, the vertical lever 60 is lifted, however, the upward movement of the vertical crank lever 60 is not transmitted to the T-shaped lever 19 because the pin 62 simply slides along the oblong hole 61 in the crank lever 60. The pivotal movement of the T-shaped lever 19 tending to lower the punch 1 begins when the pin 62 engages a lower end edge of the oblong hole 61. The pin 62 is normally held in contact with the upper end edge of the oblong hole 61 by a stopper 44 acting on the T-shaped lever 19. The length D of the oblong hole 61 is selected such that the pin 62 is brought into engagement with the lower end edge of the oblong hole 61 to thereby turn the T-shaped lever 19 clockwise for lowering the punch 1 when the light projector 8 is retracted from the vertical path of movement of the punch 1.

Figure 6:
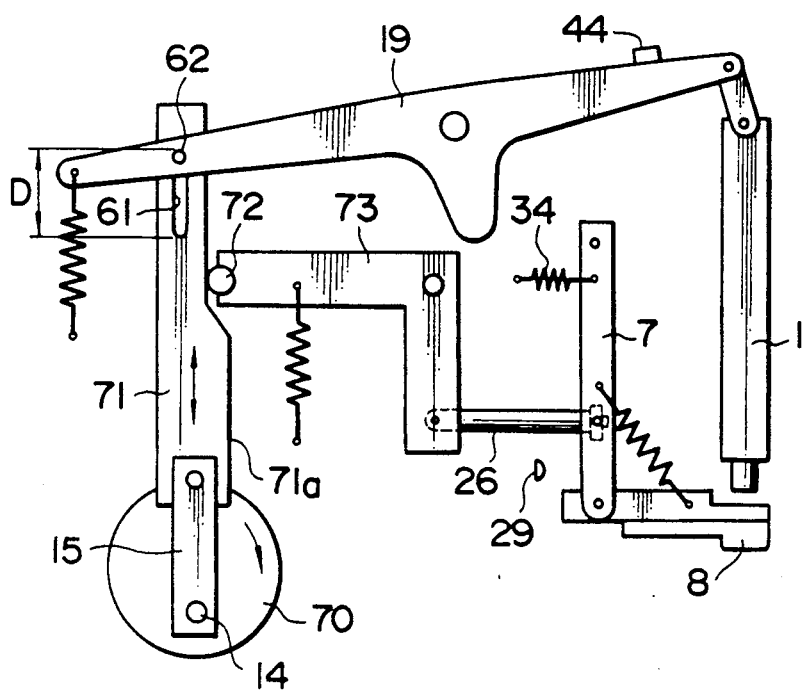
FIG. 6 is a view similar to FIG. 5, but showing a modified form of the collision protection apparatus.

A modified collision protection apparatus shown in FIG. 6 includes a rotating circular disk 70 driven by a power-driven fly wheel (see FIG. 1), and an elongate vertical lever cam 71 operatively connected at its lower end to an eccentric pin 14 secured to the circular disk 70. The lever cam 71 has an oblong hole 61 extending longitudinally along an upper end portion thereof and movably receiving therein a pin 61 connected to one end of the T-shaped lever 19, and a cam surface 71a extending along a length of one longitudinal edge of the lever cam 71 and acting on a roller follower 72 mounted on one end of a bell-crank 73. The other end of the bell-crank 73 is pivotally connected to an end of the actuating rod 26. With this construction, when the circular disk 70 is rotated in the direction of the arrow, the lever cam 71 moves vertically upwardly. The upward movement of the lever cam 71 causes the roller follower 72 to ride on the cam surface 71a whereupon the bell-crank 73 is turned clockwise to thereby retract the light projector 8 from the vertical path of movement of the punch 1 under the force of the tension coil spring 34. During that time, the punch 1 is kept immovable due to the action of the lost motion mechanism formed jointly by the oblong hole 61 and the pin 62 slidably received therein. A continuing upward movement of the lever cam 71 causes the lower end edge of the oblong hole 61 to engage the pin 62 and then turn the T-shaped lever 19 in the clockwise direction, thereby lowering the punch 1. The length of the oblong hole 61 is selected such that the engagement of the lower end edge of the oblong hole 61 and the pin 62 occurs when the light projector 8 is retracted from the vertical path of movement of the punch 1.

Figure 7:
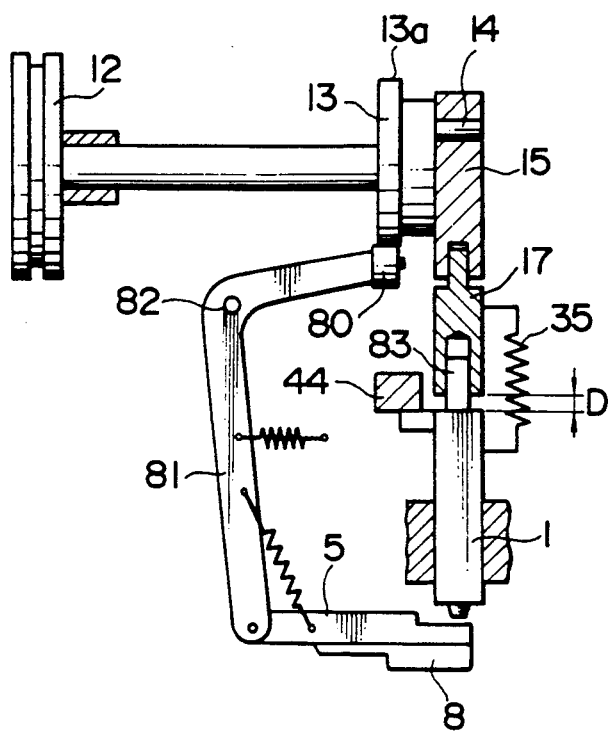
FIG. 7 is a diagrammatical front elevational view showing the general construction of a collision protection apparatus according to still another embodiment of the invention.
Figure 8:
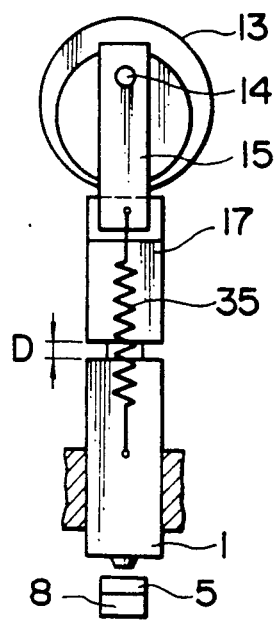
FIG. 8 is a right side view of FIG. 7.

FIGS. 7 and 8 diagrammatically illustrate a collision protection apparatus according to a sixth embodiment of the present invention. The apparatus includes an L-shaped lever 81 pivotally movable about a horizontal shaft 82. The L-shaped lever 81 carries on its upper end a roller follower 80 engageable with a cam surface 13a of the rotating cam 13 and is pivotally connected to the upper pusher 5. In response to the rotation of the cam 13, the L-shaped lever 81 turns clockwise to thereby retract the light projector 8 from the vertical path of movement of the punch 1. The cam 13 has an eccentric pin 14 connected to an upper end of a crank 15. The lower end of the crank 15 is connected with a cylinder member 17 which slidably receives a shaft 83 projecting outwardly from an upper end of the punch 1. The upper end of the punch 1 is normally spaced from the cylinder member 17 by a distance D. To this end, a stopper 44 is provided to limit the upward movement of the punch 1 as the punch is lifted by the force of a tension coil spring 35. The cylinder member 17 and the shaft 83 thus spaced jointly constitute a lost motion mechanism which provides the delay between the retracting movement of the light projector 8 and the downward movement of the punch 1. With this lost motion mechanism, a start of the downward movement of the punch 1 is retarded until the cylinder member 17 impinges upon the upper end of the punch 1, in which instance the light projector 8 is rearwardly offset from the vertical path of movement of the punch 1. Since the cylinder member 17 and the L-shaped lever 81 are directly connected with the punch 1 and the upper pusher 5, respectively, the button setting machine of this embodiment is simpler in construction than the button setting machine of any of the foregoing embodiments.

Figure 9:
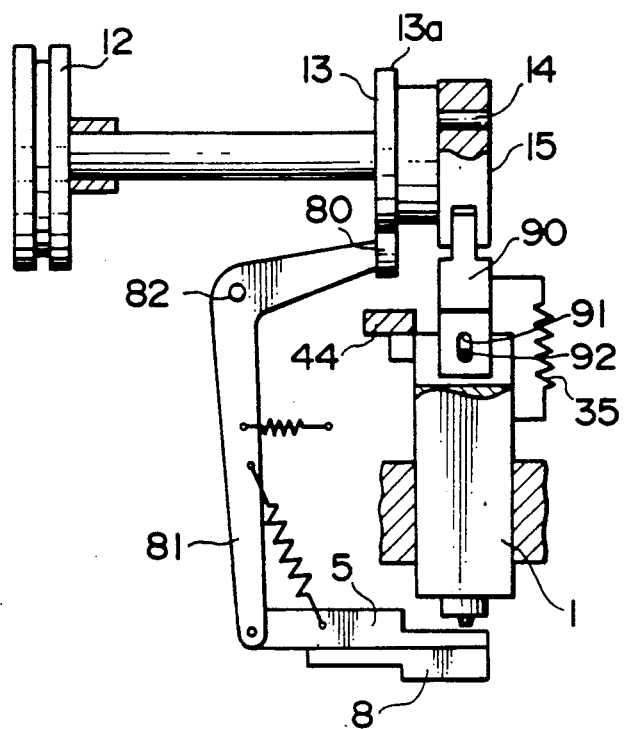
FIG. 9 is a view similar to FIG. 7, but showing a modified collision protection apparatus.
Figure 10:
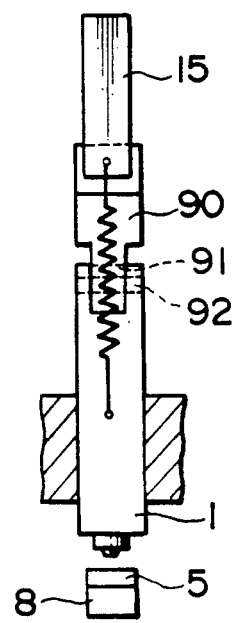
FIG. 10 is a right side view of FIG. 9.

FIGS. 9 and 10 show a modified form of the collision protection apparatus according to the present invention. The modified apparatus is substantially the same as the apparatus shown in FIGS. 7 and 8, excepting that the lost motion mechanism is composed of an oblong hole 91 formed longitudinally in an elongate vertical connecting member 90 pivotally connected to the crank 15, and a horizontal pin 92 extending transversely across a recessed upper end portion of the punch 1 and slidably received in the oblong hole 91. When the cam 13 is rotated, the connecting member 90 is moved downwardly, however, due to the lost motion mechanism, the downward movement of the connecting member 90 is not transmitted to the punch 1 until the upper end edge of the oblong hole 91 engages the pin 92 on the punch 1. During that time, the L-shaped lever 81 turns clockwise under the action of the cam surface 13a to thereby retract the light projector 8 from the vertical path of movement of the punch 1. As the connector member 90 further moves downward, the upper end edge of the oblong hole 91 is brought into engagement with the pin 2 and then urges the pin 92 downwardly to thereby lower the punch 1.

Figure 11:
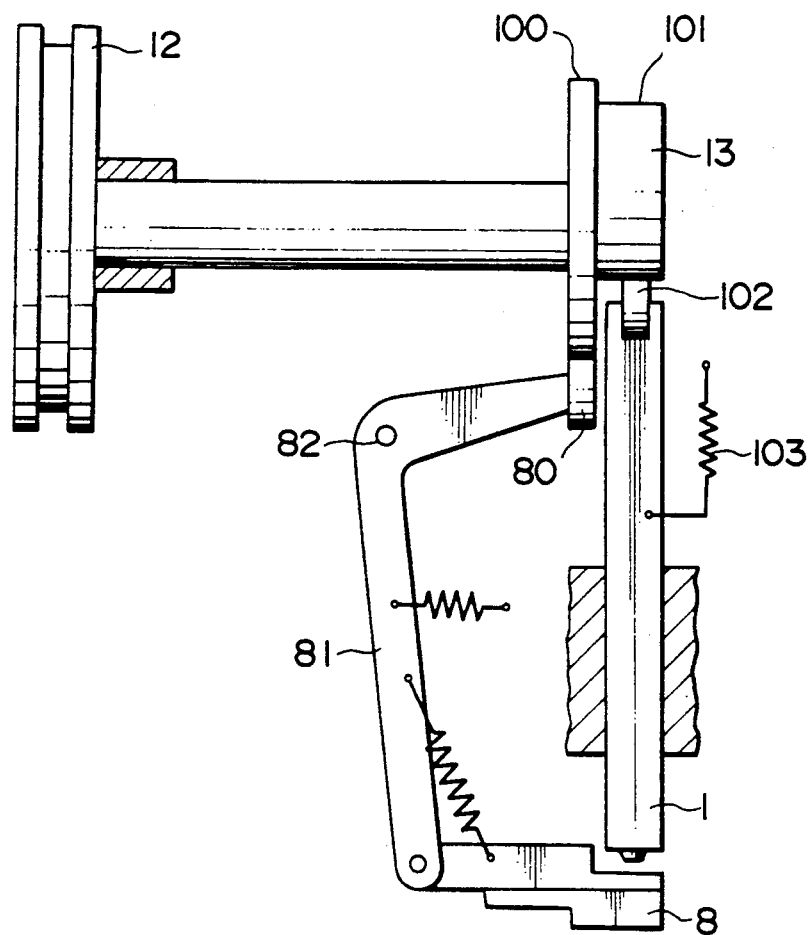
FIG. 11 is a diagrammatical front elevational view of a collision protection apparatus according to another embodiment of the invention.
Figure 12:
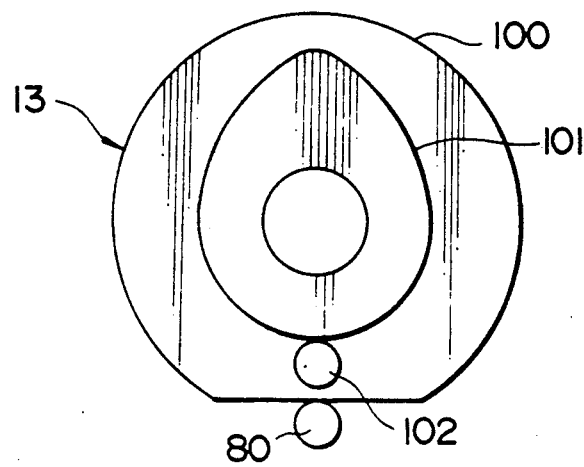
FIG. 12 is an enlarged view of a composite cam incorporated in the collision protection apparatus shown in FIG. 11.

FIGS. 11 and 12 diagrammatically show a part of a button setting machine incorporating a modified collision protection apparatus according to another embodiment of the present invention. The apparatus is similar to the apparatus shown in FIGS. 7 and 8 but differs therefrom in that the cam 13 is a composite cam including a first cam surface 100 having a cam profile which is capable of oscillating the L-shaped lever 81 via the roller follower 80 for retracting the light projector 8 from the vertical path of movement of the punch 1, and a second cam surface 100 concentric with the first cam surface 101 and having a cam profile which is capable of lowering the punch 1 via a roller follower 102 rotatably mounted on an upper end of the punch 1. When the cam 13 is rotated in either direction, the roller follower 80 on the L-shaped lever 81 rides on the first cam surface 100, thereby causing the L-shaped lever 81 to pivot in a direction to retract the light projector 8 from the vertical path of movement of the punch 1. During that time, the roller follower 102 on the punch 1 rolls along a portion of the second cam surface 101 which has a cam profile of a constant radius of curvature. Consequently, the second cam surface 101 does not produce a camming action tending to lower the punch 1. As the angular movement of the cam 13 further advances, the second cam surfaces 101 urges the roller follower 102 downwardly to thereby lower the punch 1. Thus, the first and second cam surfaces 100, 101 are so profiled as to create the delay between the retracting movement of the light projector 8 and the downward movement of the punch 1. The punch 1 is returned to its uppermost position under the force of the tension coil spring 103. The radial disk cam 13 may be substituted by a face cam having first and second cam surfaces on its one side. As an alternative, a face cam having two grooves in its opposite surfaces may be employed in place of the radial disk cam 13.

Obviously, various modifications and variations of the present invention are possible in the light of the above teaching. It is therefore to be understood that within the scope of the appended claims the invention may be practiced otherwise than as specifically described.

What is claimed is:

1. An apparatus for protecting a horizontally reciprocable light projector from collision with a vertically reciprocable punch of a button setting machine, the button setting machine including a power-driven rotating drive member, the light projector being normally disposed directly below the punch, said apparatus comprising:
   (a) first means for transmitting a driving power from the rotating drive member to the light projector to reciprocate the light projector along a horizontal path;
   (b) second means for transmitting a driving power from the rotating drive member to the punch to reciprocate the punch along a vertical path; and
   (c) mechanical means for producing a delay between retracting movement of the light projector and the downward movement of the punch to such an extent that the light projector is retracted from the vertical path of movement of the punch before the punch starts moving downward, wherein said first power transmitting means includes a cam rotated by the rotating drive member and a pivotable cam lever operatively connected with the light projector and driven by said cam to reciprocate the light projector toward and away from the vertical path of movement of the punch, said second power transmitting means including a crank mechanism operatively connected with the punch and said cam and driven by said cam to reciprocate the punch along the vertical path, said delay-producing mechanical means including a lost motion mechanism incorporated in said crank mechanism.

2. An apparatus according to claim 1, wherein said second power transmitting means further includes a lever having one end operatively connected with the punch and an opposite end connected to said crank mechanism.

3. An apparatus according to claim 2, wherein said second power transmitting means further includes a toggle joint having two bars pivoted together at one end, one of said bars being connected at its opposite end to the punch, said lever comprising a bell-crank having one end operatively connected to a pivot of said toggle joint.

4. An apparatus according to claim 1, wherein said crank mechanism includes a crank connected at its one end to said cam by an eccentric pin, said lost motion mechanism including a shaft extending from an opposite end of said crank and having an annular actuating flange, and a cylinder member connected to said opposite end of said lever and slidably receiving therein said shaft, said actuating flange being normally separated from said cylinder member and engageable with said cylinder member to turn said lever in a direction to lower the punch when the light projector is retracted from the vertical path of movement of the punch.

5. An apparatus according to claim 1, wherein said crank mechanism includes an elongate crank lever connected at its one end to said cam by an eccentric pin, said lost motion mechanism comprising an oblong hole extending longitudinally in said crank lever and a pin slidably received in said oblong hole and connected to opposite end of said lever, said oblong hole having one end edge normally separated from said pin and engageable with said pin to turn said lever in a direction to lower the punch when the light projector is retracted from the vertical path of movement of the punch.

6. An apparatus according to claim 1, wherein said crank mechanism includes a crank connected at its one end to said cam by an eccentric pin, said lost motion mechanism including a cylinder member connected at one end to the opposite end of said crank and a shaft integral with an upper end of the punch and slidably received in said cylinder member, said cylinder member being normally separated from the upper end of the punch and engageable with the upper end of the punch to lower the punch when the light projector is retracted from the vertical path of movement of the punch.

7. An apparatus according to claim 1, wherein said crank mechanism includes a crank connected at its one end to said cam by an eccentric pin and a connecting member connecting the opposite end of the crank and an upper end of the punch, said lost motion mechanism comprises an oblong hole extending longitudinally in said connecting member and a pin slidably received in said oblong hole and connected to the upper end of the punch, said oblong hole having one end edge normally separated from said pin and engageable with said pin to lower the punch when the light projector is retracted from the vertical path of movement of the punch.

8. An apparatus for protecting a horizontally reciprocable light projector from collision with a vertically reciprocable punch of a button setting machine, the button setting machine including a power-driven rotating drive member, the light projector being normally disposed directly below the punch, said apparatus comprising:
   (a) first means for transmitting a driving power from the rotating drive member to the light projector to reciprocate the light projector along a horizontal path;
(b) second means for transmitting a driving power from the rotating drive member to the punch to reciprocate the punch along a vertical path; and
(c) mechanical means for producing a delay between retracting movement of the light projector and the downward movement of the punch to such an extent that the light projector is retracted from the vertical path of movement of the punch before the punch starts moving downward, wherein said first power transmitting means includes a circular disk rotated by the rotating drive member, a lever cam reciprocally driven by said circular disk and having a cam surface, and a bell-crank having one end operatively connected with the light projector and the opposite end co-acting with said cam surface to turn said bell-crank, said second power transmitting means including a lever operatively connected at its one end with the punch and at its opposite end with said lever cam, said delay producing mechanical means including a lost motion mechanism composed of an oblong hole extending longitudinally in said cam lever and a pin slidably received in said oblong hole and connected to said opposite end of said lever, said oblong hole having one end edge normally separated from said pin and engageable with said pin to turn said lever in a direction to lower the punch when the light projector is retracted from the vertical path of movement of the punch.

9. An apparatus for projecting a horizontally reciprocable light projector from collision with a vertically reciprocable punch of a button setting machine, the button setting machine including a power-driven rotating drive member, the light projector being normally disposed directly below the punch, said apparatus comprising:

(a) first means for transmitting a driving power from the rotating drive member to the light projector to reciprocate the light projector along a horizontal path, including a composite cam rotated by the rotating drive member and having first and second cam surfaces, and a pivotable cam lever operatively connected with the light projector and driven by said first cam surface of said composite cam to reciprocate the light projector toward and away from the vertical path of movement of the punch;
(b) second means for transmitting a driving power from the rotating drive member to the punch to reciprocate the punch along a vertical path; and
(c) mechanical means for producing a delay between retracting movement of the light projector and the downward movement of the punch to such an extent that the light projector is retracted from the vertical path of movement of the punch before the punch starts moving downward, said delay producing mechanical means comprising said first and second cam surfaces, said first and second cam surfaces having respective cam profiles capable of producing said delay between the retracting movement of the light projector and the downward movement of the punch.

10. An apparats according to claim 9, wherein said second power transmitting means including a lever operatively connected at its one end with the punch and reciprocable connecting rod having one end connected with the opposite end of said lever and the opposite end co-acting with said cam surface to turn said lever for reciprocating the punch.

11. An apparatus according to claim 9, wherein said second power transmitting means including a cam follower rotatably mounted on an upper end of the punch and coacting with said second cam surface to move the punch downward.

* * * * *